Aug. 18, 1925.                                                          1,549,935
G. W. VOLZ
SEPARATOR AND LUBRICATOR FOR STEAM LINES
Filed Feb. 12, 1924

INVENTOR
GOTTLIEB. W. VOLZ.
BY
ATTORNEYS.

Patented Aug. 18, 1925.

1,549,935

UNITED STATES PATENT OFFICE.

GOTTLIEB W. VOLZ, OF LONG BEACH, CALIFORNIA, ASSIGNOR, BY MESNE ASSIGNMENTS, OF ONE-HALF TO S. D. WEAVER, OF LOS ANGELES, CALIFORNIA.

SEPARATOR AND LUBRICATOR FOR STEAM LINES.

Application filed February 12, 1924. Serial No. 692,366.

*To all whom it may concern:*

Be it known that I, GOTTLIEB W. VOLZ, a citizen of the United States, residing at Long Beach, in the county of Los Angeles, State of California, have invented a new and useful Separator and Lubricator for Steam Lines, of which the following is a specification.

This invention relates to equipment for use with steam power piping and has its particular utility in the oil fields where steam is employed for driving well drilling apparatus.

In the oil fields, it is often customary to use a central steam generating plant in the form of a battery of boilers from which steam is delivered to the engines employed at a number of derricks. Owing to the fact that the steam installations are of a temporary nature, it is not attempted to insulate the steam lines, most of them being laid along the surface of the ground or in shallow ditches. The intermittent use of the steam due to the intermittent operation of the drilling engine creates a condition which often proves troublesome to the driller. During the time that a drilling engine is standing idle, water condenses in the steam piping, this water being carried into the engine in the form of a slug when the engine is again started. It will be recognized that a body of water introduced into an engine in this manner often causes breakage and makes necessary the frequent replacement and repair of valve parts. Also the presence of condensates very seriously cuts down the efficiency of the engine with the result that at certain times when ultimate power is required, the engine can operate only at low efficiency owing to the presence of condensed water.

My invention has been developed with the view toward eliminating the difficulty now encountered due to the condensates in the steam line, and considerably increases the dependability of the drilling engine; furthermore, assuring the driller that the engine will at all times respond to the load requirements placed thereon.

It is also an object of the invention comprising a water separator and an oil reservoir placed in parallel, to provide a device which serves as an efficient lubricator for the drilling engine, this lubricator delivering no oil when the engine is not running, and when the engine is in operation, delivering oil proportionate in quantity to the speed of the engine.

Referring to the drawing which is for illustrative purposes only,

Fig. 1 is a diagrammatic elevation showing the manner in which the invention is employed.

Fig. 2 is a plan view of the separator.

Fig. 3 is a section taken substantially on the plane indicated by the line 3—3 of Fig. 2.

In Fig. 1 of the drawing, 11 indicates a steam boiler which may be located at a considerable distance from the steam engine 12. Steam for operation of the engine is delivered through piping 13 which connects with the inlet 14 of the separator 15. From the separator 15, piping 16 is extended to the engine 12. As shown in Figs. 2 and 3, the inlet 14 of the separator 15 consists of a pipe which extends tangentially through the upper end 18 of the cylindrical wall 19 and opens at 20 into an annular space 21 between the wall 19 and an inner cylindrical wall 22 which extends downwardly from the head 23 of the separator 15. The entering steam centrifuges through the annular space 21 at a high rate of speed and moves helically downwardly so as to pass around the outwardly flared lip 25 formed at the lower end of the inner cylindrical wall 22. The steam then passes upwardly as indicated by the arrows 26 and discharges through a centrally disposed outlet 26, into the piping 16 in a condition free from condensates. The centrifugal action of the steam in the annular space 21 causes all condensed moisture to collect and flow downwardly on the inner face of the wall 19.

At a point substantially opposite the lip 25, a band or layer of woven wire fabric or screen 30 is placed on the inner face of the wall 19. The action of the lip 26 is to throw the steam outwardly toward this screen layer so that any condensates therein will strike against the screen and will be held thereby. Owing to the large area within the inner cylindrical wall 22, the movement of the steam will be reduced to a much lower rate of speed after leaving the annular space 21.

In the bottom 32 of the separator 15 is placed a water drain pipe 33 which is preferably connected to a steam trap or which may be controlled by a valve. A sand and sediment drain 34 is extended from the bottom 32, from which sand, sediment, and scale may be drawn at intervals.

The oiling device which constitutes a part of my invention employs a metal oil container 35 which may be filled with oil through an inlet spout 36 and which is provided with a drain valve 37. Condensates for upwardly motivating the oil are delivered into the bottom of the container 35 through a pipe 39, exterior piping 40 which extends to a valve 41 and an intake nipple 42 which connects into the bottom of the inlet 14. The condensate from the steam piping must necessarily flow past the nipple 42 and a certain quantity thereof is carried through the piping 40 and the vertical pipe 39 into the container 35, thus causing flotation of the oil upwardly through a check valve 45 and a needle valve 46 which is part of the oil sight feed fixture 47, which employs a glass 48. From the upper casting of the fixture 47, a pipe 49 having an upwardly turned end 50 projects into the outlet 26. The flotation of water introduced through the pipe 39 into the container 35 is not sufficient to carry the effective oil level to the end 50 of the piping 49. The drop in pressure between the inlet 14 and the outlet 26 when the engine is in operation is sufficient, however, to produce the desired discharge of oil into the current of steam passing through the outlet, this discharge of oil varying with the steam consumption of the engine owing to the fact that when the engine is drawing considerable steam, this difference in pressure between the inlet 14 and the outlet 26 will be greater than when the engine is consuming a small amount of steam.

I claim as my invention:

1. In a water separator and lubricator for steam lines, the combination of: a cylindrical shell having a steam outlet; an inner cylindrical wall extending downwardly within said shell; and a steam inlet discharging tangentially into the annular space between said inner cylindrical wall and said shell, the incoming steam and condensates being thereby set into action causing the condensates to collect on the inner cylindrical face of said shell; an oil reservoir mounted below the level of said inlet; piping extending from said inlet to the bottom of said oil reservoir; and valve controlled oil delivery piping extending from the upper end of said oil reservoir to said steam outlet.

2. In a water separator and lubricator for steam lines, the combination of: a cylindrical shell having a steam outlet; an inner cylindrical wall extending downwardly within said shell; and a steam inlet discharging tangentially into the annular space between said inner cylindrical wall and said shell, the incoming steam and condensates being thereby set into action causing the condensates to collect on the inner cylindrical face of said shell; an oil reservoir mounted below the level of said inlet; piping extending from said inlet to the bottom of said oil reservoir; and valve controlled oil delivery piping extending from the upper end of said oil reservoir to said steam outlet; and check means for preventing a reverse flow through said oil delivery piping when the flow of steam through said separator is discontinued.

3. In a water separator and lubricator for steam lines, the combination of: a cylindrical shell having a steam outlet and a steam inlet; means in said shell for separating condensates from the steam, thereby causing a drop in pressure between said inlet and said outlet; an oil reservoir mounted below the level of said inlet; piping extending from said inlet to the bottom of said oil reservoir; and valve controlled oil delivery piping extending from the upper end of said oil reservoir to said steam outlet; and check means for preventing a reverse flow through said oil delivery piping when the flow of steam through said separator is discontinued.

4. In combination, in a steam line: a water separator and a lubricating oil reservoir placed in parallel and each provided with an inlet and an outlet; means for controlling a flow of condensed water from the inlet of said separator into an inlet of said reservoir and means for controlling the flow of oil from the outlet of said reservoir into steam that has passed through said separator.

In testimony whereof, I have hereunto set my hand at Los Angeles, California, this 4th day of February, 1924.

GOTTLIEB W. VOLZ.